United States Patent [19]

Omata

[11] 4,442,588
[45] Apr. 17, 1984

[54] AUTOMATIC SYSTEM FOR PRODUCING ELECTROLYTE IMPREGNATED CAPACITOR ELEMENTS

[75] Inventor: Katsumori Omata, Hachioji, Japan

[73] Assignee: Far East Engineering Co., Ltd., Hachioji, Japan

[21] Appl. No.: 247,243

[22] Filed: Mar. 25, 1981

[30] Foreign Application Priority Data

Apr. 10, 1980 [JP] Japan .................................. 55-47232

[51] Int. Cl.³ ............................................. H01G 9/00
[52] U.S. Cl. ..................................... 29/570; 29/742; 29/759; 118/425; 140/147; 427/80; 427/81
[58] Field of Search ........................ 29/570, 759, 742; 140/147; 427/79, 80, 81; 118/421, 425

[56] References Cited

U.S. PATENT DOCUMENTS

| | | | |
|---|---|---|---|
| 3,071,166 | 1/1963 | Gutbier | 140/147 X |
| 3,106,945 | 10/1963 | Wright et al. | 140/147 |
| 3,116,535 | 1/1964 | Ganz et al. | 427/81 X |
| 3,286,740 | 11/1966 | Fuchs, Jr. et al. | 140/147 |
| 3,573,575 | 4/1971 | Brady et al. | 427/81 X |
| 4,203,194 | 5/1980 | McGrath | 29/570 |

Primary Examiner—L. Dewayne Rutledge
Assistant Examiner—Alan E. Schiavelli
Attorney, Agent, or Firm—Ziems & Walter

[57] ABSTRACT

A system for producing electrolyte impregnated capacitor elements comprises a reforming device for reforming the leads of capacitor elements which are brought thereto, a clutch device for clutching the reformed capacitor elements, an aligning device for aligning a predetermined number of the reformed capacitor elements, a holding device holding the aligned capacitor elements, an electrolyte impregnating vessel receiving the aligned capacitor elements to impregnate with the electrolyte, a blow-off device for blowing off the excess amount of electrolyte from the electrolyte impregnating capacitor elements, and transmission devices each operated in a predetermined sequence to transmit the capacitor elements between the above mentioned capacitor element treating devices.

8 Claims, 16 Drawing Figures

AUTOMATIC SYSTEM FOR PRODUCING ELECTROLYTE IMPREGNATED CAPACITOR ELEMENTS

BRIEF DESCRIPTION OF THE INVENTION

The invention relates to a system for automatically producing electrolyte impregnated capacitor elements, and more particularly relates to a system for automatically reforming the leads of capacitor elements, aligning a predetermined number of capacitor elements, then automatically holding the aligned capacitor elements and bringing these into an electrolyte impregnating vessel, and then automatically conveying the electrolyte impregnated capacitor elements into a structure for blowing off the excess amount of electrolyte from the electrolyte impregnated capacitor elements.

So far, it has been considered difficult to automatically impregnate the capacitor elements in a series of treating processes, and no automatic system has been realized for attaining this object of the invention. In the conventional method, an electrolyte impregnating vessel, which is to be vacuumized, is provided independently from the preceeding as well as the following capacitor element treating processes. The capacitor elements are impregnated with the electrolyte in the vessel either in a condition (1), in which a group of capacitor elements individually separate from each other are manually placed in the vessel, or in a condition (2), in which a predetermined number of capacitor elements are manually attached to an adhesive tape in alignment with each other and wound up around a separate reel which is manually placed in the vessel.

A defect or disadvantage common to either of the electrolyte impregnating methods is that the electrolyte is as well coated on the leads of capacitor elements, which are generally tin-coated, resulting in a deterioration of the capability for the capacitor elements to be soldered to a printed circuit on a plate. It is also difficult to provide an even amount of electrolyte impregnation to each of the capacitor elements by way of a centrifugal separator for taking away the exceeded amount of electrolyte from the electrolyte impregnated capacitor elements. Since the above mentioned electrolyte impregnating operation is manually performed, the operation is time consuming, inefficient, and interferes with the efficiency of the next capacitor element assembling process.

Additionally, in the condition (1) of electrolyte impregnation, it is unavoidable that the leads of capacitor elements are bent out of parallel alignment and that the capacitor elements themselves are deformed. As the result, it becomes difficult to automatically hand over the capacitor elements to the capacitor assembling machine in the next process. On the other hand, the condition (2) of electrolyte impregnation is designed to automatically hand over the capacitor elements to the capacitor assembling machine. This method, however, requires a device to attach the capacitor elements to the adhesive tape and a specific electrolyte impregnating vessel. Also, the adhesive tape can not be used again. This method is, therefore, costly.

Generally the leads of electrolyte capacitors are thin and soft and are easily bent and twisted during the tape winding process and the subsequent treatments. It is therefore doubtful that the leads of electrolytic capacitors will remain straight and parallel with each other at least until they are impregnated with electrolyte. It is, therefore, important to apply a plastic reform to the bent and twisted leads of the capacitor elements and then to arrange the capacitor elements in alignment for the purpose of achieving the automated electrolyte impregnation system of capacitor elements. However, the conventional art has never been successful in automatic application of the plastic reform to the leads of capacitor elements and then in automatic alignment of the reformed capacitor elements.

The invention has been provided to eliminate the defects and disadvantages of the prior art and to solve the problems presented to an automatic electrolyte impregnating system of capacitor elements. It is, therefore, a primary object of the invention to completely automate the processes of aligning and impregnating with the electrolyte, a predetermined number of capacitor elements to thereby remarkably increase the production efficiency of the electrolyte impregnated capacitor elements. It is another object of the invention to automatically provide for plastic reformation of the leads of capacitor elements and then to automatically transfer the reformed capacitor elements to the aligning process. It is another object of the invention to maintain the level of the electrolyte in the electrolyte impregnating vessel so as to prevent the electrolyte from contacting or covering the leads of capacitor elements placed in the electrolyte impregnating vessel and thus improve the capability of the capacitor elements to be soldered to the circuit plate. It is another object of the invention to provide a cover for the electrolyte impregnating vessel which is moved between an operative position to close the vessel and an inoperative position to open the vessel in a timed relation with the movement of a capacitor holder so as to facilitate the movement of the aligned capacitor elements into and out of the vessel, said cover being formed to sealingly close the vessel to enhance evacuation of the vessel. It is another object of the invention to bring a predetermined number of capacitor elements into the electrolyte impregnating vessel as the capacitor elements are held in alignment by the holder, and to locate the capacitor elements at a predetermined place where the capacitor elements are positioned just below the upper level of the electrolyte injected into the vessel so that the capacitor elements may be evenly impregnated with the electrolyte. It is still another object of the invention to blow off the excess electrolyte of the capacitor elements by way of a compressed air flow to finally make uniform the amount of electrolyte impregnated in the capacitor elements.

Briefly according to the system of the invention, the capacitor elements are conveyed in a row by a vibrator device to a station where the capacitor elements are at the leads thereof pressingly held one by one by a W-shaped clamp so that the leads of the capacitor elements are each plastically reformed, that is, straightened into parallel alignment to each other. Then the plastically reformed capacitor elements are conveyed to the next process where these capacitor elements are arranged in alignment to be grasped by a holder which is conveyed into the electrolyte impregnating vessel which is then covered and vacuumized to promote the injection of electrolyte to be impregnated into the capacitor elements. The upper level of the electrolyte is kept constant in the vessel and a predetermined time of the electrolyte impregnation is effected.

The other features and advantages of the invention will be apparent from the following description of a preferred embodiment in reference to the attached drawings, in which.

DETAIL DESCRIPTION OF THE INVENTION

Figure 1:
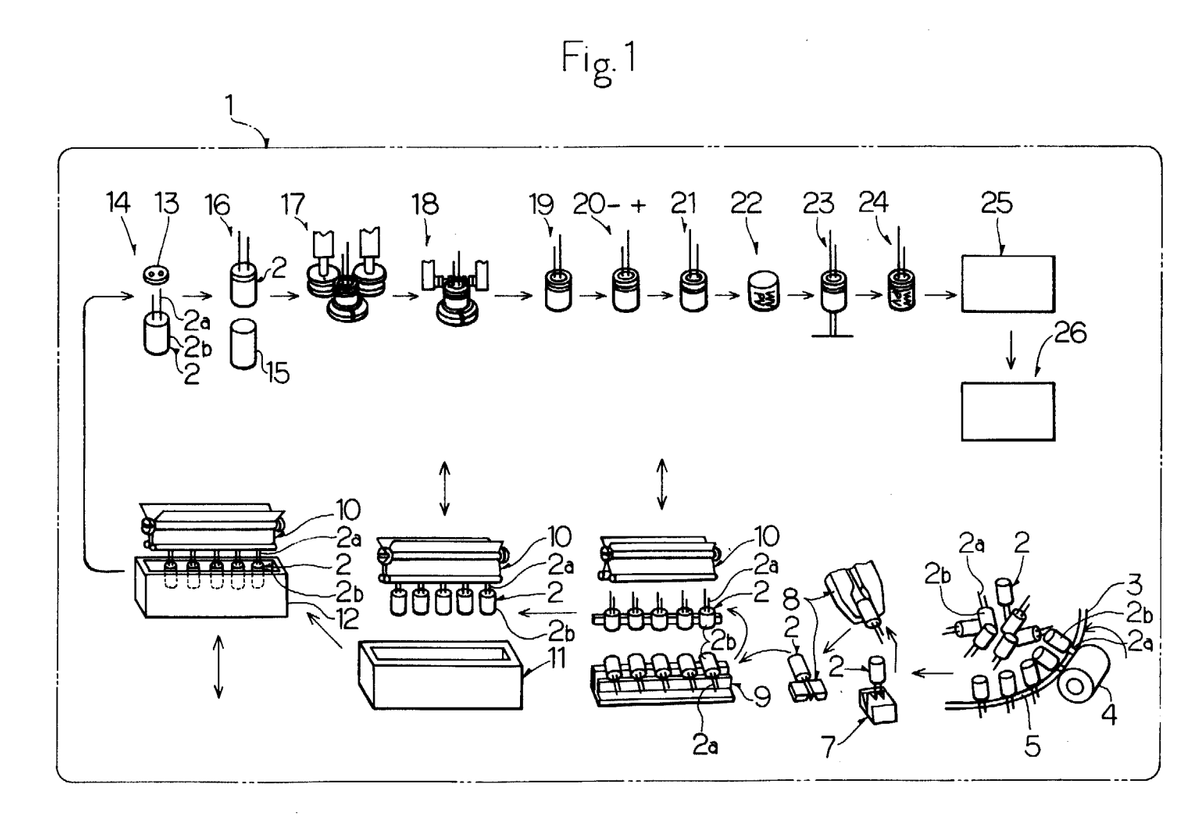
FIG. 1 is an outlined representation of the processes constituting a capacitor treating system of the invention.

In reference to FIG. 1 showing the outline of the invented system, the rolled up capacitor elements 2 are individually placed in the round vibrator device 3, in which the capacitor elements are vibrated toward a rotating element 4 having a number of magnets arranged therein spaced from each other. The rotating element 4 attracts the capacitor elements one after another to guide the iron leads 2a of the capacitor elements 2 down into a grooved vibrator conveyer 5 which conveys the capacitor elements 2 to a lead reforming device 7 as the capacitor elements stand erect as shown. The lead reforming device 7 straightens the leads 2a of capacitors 2 in parallel alignment. The reformed capacitor elements 2 are individually brought to an aligning device 9 by a conveyer device 8, where a predetermined number (about 20 pieces) of capacitor elements 2 are arranged in alignment as these are laid sidewise. The aligning device 9 is then turned 90° so as to direct up the leads 2a of capacitor elements 2. Then a capacitor holder 10 moves to grip the leads 2a of the aligned capacitor elements 2 and carries the latter to an electrolyte impregnating vessel 11. The capacitor holder 10 is then brought down into the vessel 11 as it grips the aligned capacitors. The vessel 11 is closed and vacuumized to bring the electrolyte therein to a predetermined level. Then the electrolyte is impregnated into the capacitor elements 2. The electrolyte impregnated capacitor elements are taken out of the vessel 11 as these are held by the holder 10 and brought into a chamber 12, in which the excess amount of electrolyte is blown off from the capacitor elements 2 by a high pressure air flow. Thus the electrolyte impregnating processes of capacitor element production are finished.

The invention relates to a series of processes starting from the process 7 where the leads 2a of capacitors are reformed to the process 12 where the excess amount of electrolyte is blown off from the capacitor elements 2.

As to the subsequent processes, the capacitor elements 2 are taken out individually, and a rubber element 13 is attached to each of the capacitor element as shown in the process 14. In the next process 16, an aluminum cover 15 is attached to each of the capacitor elements 2. In the next process 17, each capacitor element is curled around at one end periphery thereof. In the next process 18, the opened end of the cover 15 is curled toward the rubber face to enclose the rubber element 13 into the capacitor element. In the next process 19, the enclosure of the rubber element 13 is checked. In the next process 20, marks are attached to each of the capacitor element to discriminate the positive and negative side thereof. In the next process 21, the capacitor element 2 is inverted sidewise to attach the marks distinguishing the positive and negative sides thereof. In the next process 22, an outer capping tube is conveyed and the capped capacitor element is checked. In the next process 23, the capacitor element is positioned at a predetermined level. In the next process 24, the outer capping tube is shrink fitted around the capacitor element by way of a heater. In the next process 25, the existence of the outer capping tube is checked, and in the final process 26, the quality of the finished-up capacitor element is checked. These processes are automatically carried out.

Figures 2, 3, 4:
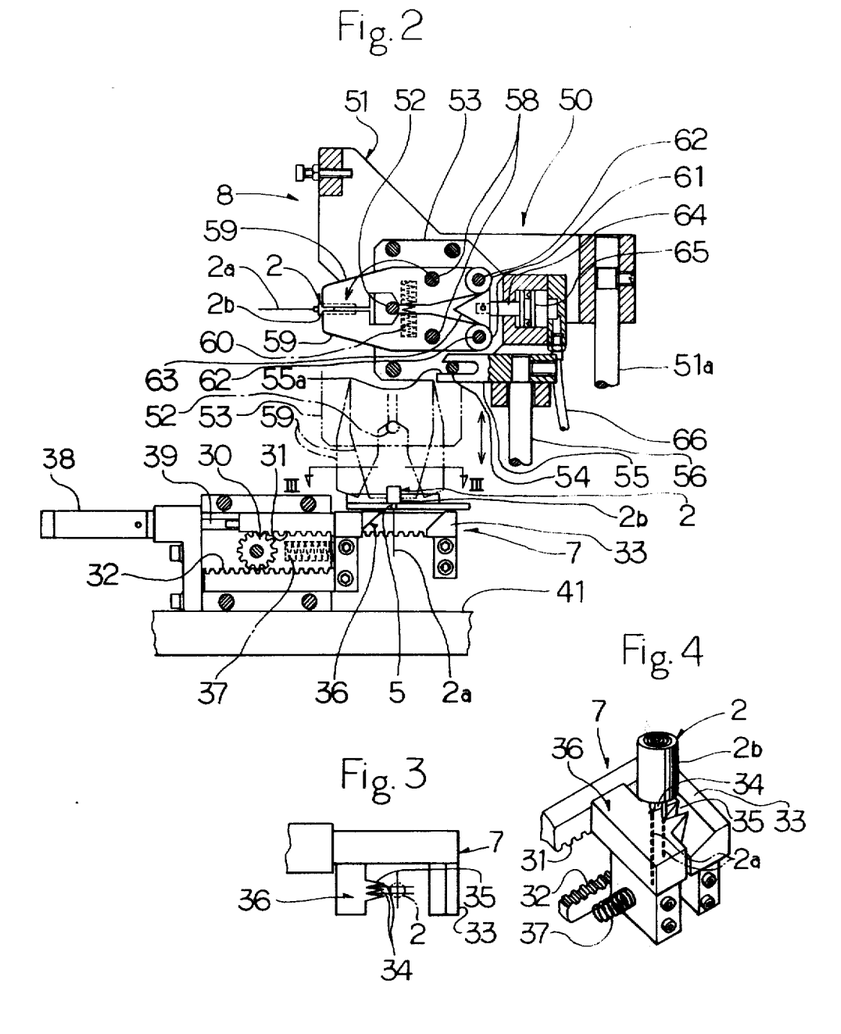
FIG. 2 is a front elevational view of a device applying a plastic reform to the leads of capacitor elements.
FIG. 3 is a plan view of a part in FIG. 2 taken along the line III—III.
FIG. 4 is a perspective view of the same part in FIG. 2 actually giving a plastic reform to the leads of a capacitor.

In reference to FIGS. 2–4 showing the lead reforming device and the conveyer device of capacitor elements, the lead reforming device 7 is composed of a pair of spaced upper and lower racks 31, 32 each engaging with a pinion 30, a member 36 with W-shaped grooves defined by three triangular projections 35 and secured to the lower rack 32, a member 33 of substantially trapezoidal shape in the vertical section secured to the upper rack 31, an air cylinder 38 for pushing the upper rack 31 in the rightward direction by way of a rod 39, and a spring 37 normally biasing the grooved member 36 in the leftward direction. The lead reforming device 7 is located on a bed plate 41. In FIG. 2, the reference numeral 5 designates the grooved conveyer carrying the capacitor element 2 with the leads 2a directed downwardly to a position between the lead reforming members 33, 36, which pressingly cramp the leads 2a of capacitor element 2 as shown in FIG. 4.

Figure 5:
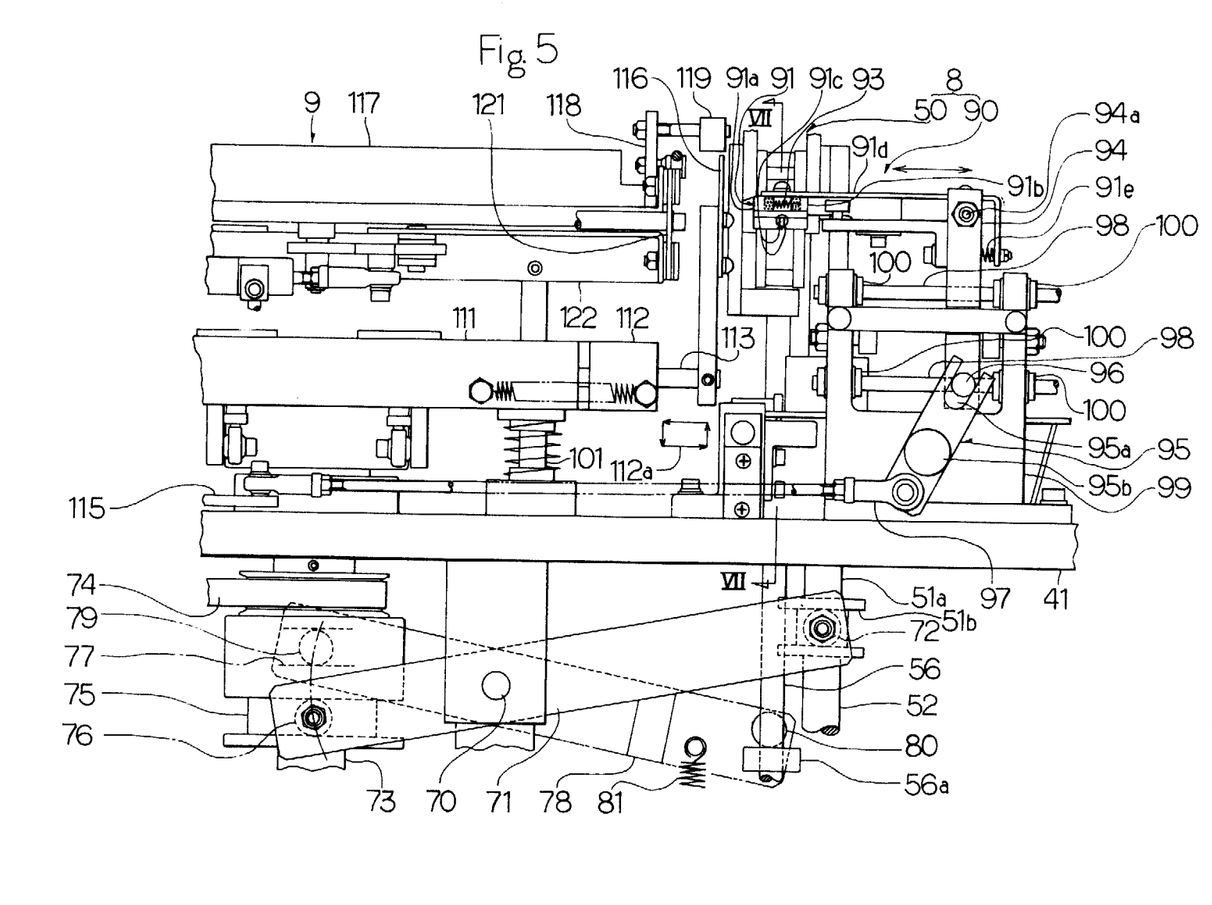
FIG. 5 is a front elevational view of a device for aligning a predetermined number of capacitor elements.
Figure 6:
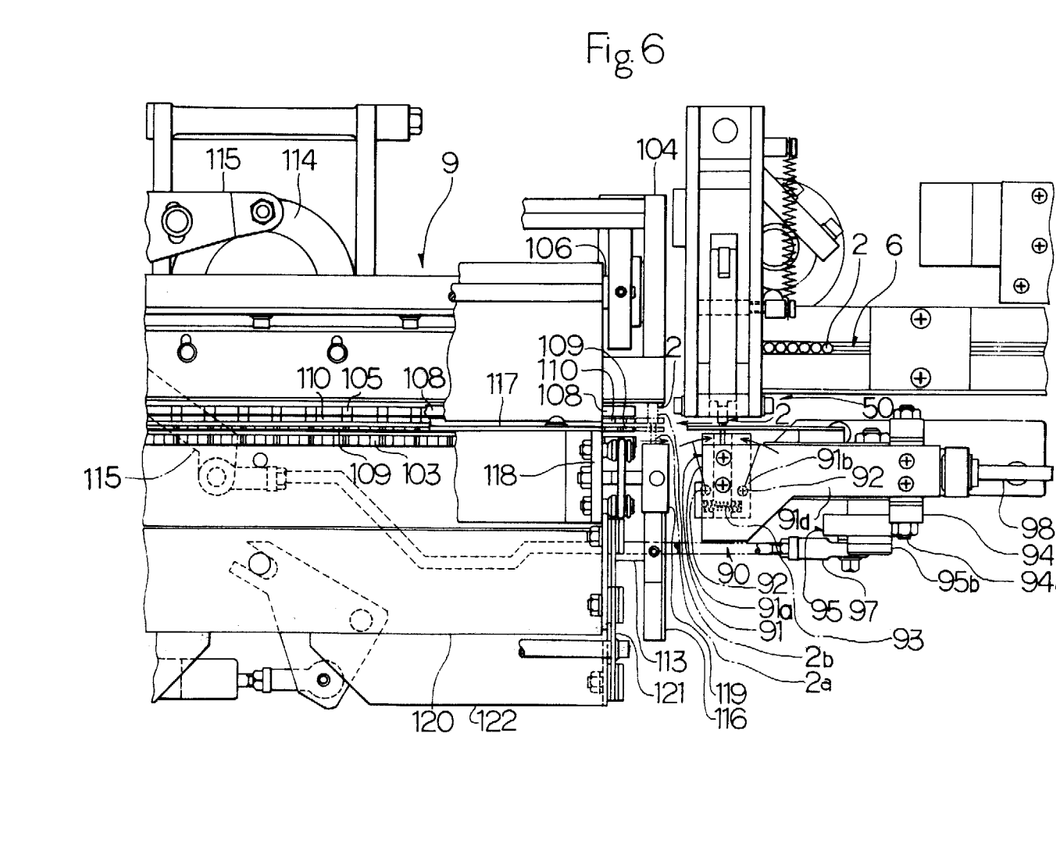
FIG. 6 is a plan view of the device in FIG. 5.

In FIG. 2, the reference numeral 50 generally designates a transmission device which grips the head 2b of the capacitor element 2 clamped at the leads 2a thereof by the lead reforming device 7 and pulls out the leads 2a in an upward direction from the lead reforming device 7 to straighten the leads 2a in parallel alignment. Then the capacitor element 2 is turned 90° in the clockwise direction and handed over to a clamp device at the next process station as shown in FIGS. 5 and 6. The transmission device 50 is shown most clearly in FIG. 2 to include a pair of jaws 59, 59 pivotally mounted on pivots 58 respectively provided on a support 53 which is also pivotally mounted on a pivot 52 anchored in a base 51 which is secured to a rod 51a to be vertically movable at predetermined time intervals. The jaws 59, 59 are normally biased in the opposite directions by a spring 60 so that the jaws may be opened at the left end thereof as shown in FIG. 2. The jaws 59, 59 are at the right ends thereof provided with rollers 61 which are respectively rotatable on pivots 62, 62. An actuating member 63, triangular in vertical section, is located between the two rollers 61, 61. The actuating member 63 is laterally moved by a rod 64 which, in turn, is laterally moved by a piston 65 operated by compressed air transmitted through a flexible pipe 66, so that the jaws 59, 59 may be opened and closed at the left end thereof by the action of the spring 60. As shown, a pin 54 is provided on the support 53. The pin 54 is in engagement with a slot 55a formed in a yoke 55 secured to a rod 56 which is vertically movable at predetermined time intervals.

In FIGS. 5 and 6, the reference numeral 50 again generally designates the above mentioned transmission device. The vertical rod 51a is extended to below the bed plate 41 (FIG. 5) and has a groove 51b engaged by a roller 72 which is provided at one end of a lever 71 pivotally mounted intermediate the ends thereof on a fixed pivot 70. The lever 71 has another roller 76 provided at the other end thereof and engaging a grooved cam 75 secured to a vertical shaft 73 which is rotated by way of a belt 74. Similarly another lever 78 is pivotally mounted on the fixed pivot 70. The lever 78 has a roller 80 provided at one end thereof and engaging a flange 56a of the vertical rod 56, and has a roller 79 provided at the other end thereof and engaging a grooved cam 77 which is secured to the vertical shaft 73. The lever 78 is biased by a spring 81 in the clockwise direction so that the roller 80 may be normally pressed against the flange 56a of the vertical rod 56.

As shown in FIGS. 5 and 6, the reference numeral 90 designates a clutch device for clutching the capacitor element 2 which is handed over thereto by the transmission device 50. Upon clutching the capacitor element 2, the clutch device 90 is moved in the leftward direction to hand over the capacitor element 2 to the aligning device 9. The clutch device 90 includes a clutch 91 composed substantially of a pair of clutching elements 91a, 91b (FIG. 6) which are pivotally mounted on the respective pivots 92, 92 secured to a support 91d on the underside thereof and are normally biased by a spring 93 so that the clutching elements 91a, 91b may be pressed against each other at the free ends thereof providing a pair of inverted V-shaped contacts 91c (FIG. 5). The support 91d is secured to a carrier 94 which is fixedly connected to a pair of vertically spaced rods 98, 98 each journaled in a pair of ball bearings 100, 100 and laterally or axially slidable therein. The ball bearings 100 are supported by a bracket 99 mounted on the bed plate 41. The carrier 94 has a roller 96 provided on one side thereof which is in engagement with a forked end 95a of a crank 95 which is pivotal around a pivot 95b fixed on the bracket 99. The crank 95 has the other end connected to one end of a drive link 97.

Figure 7:
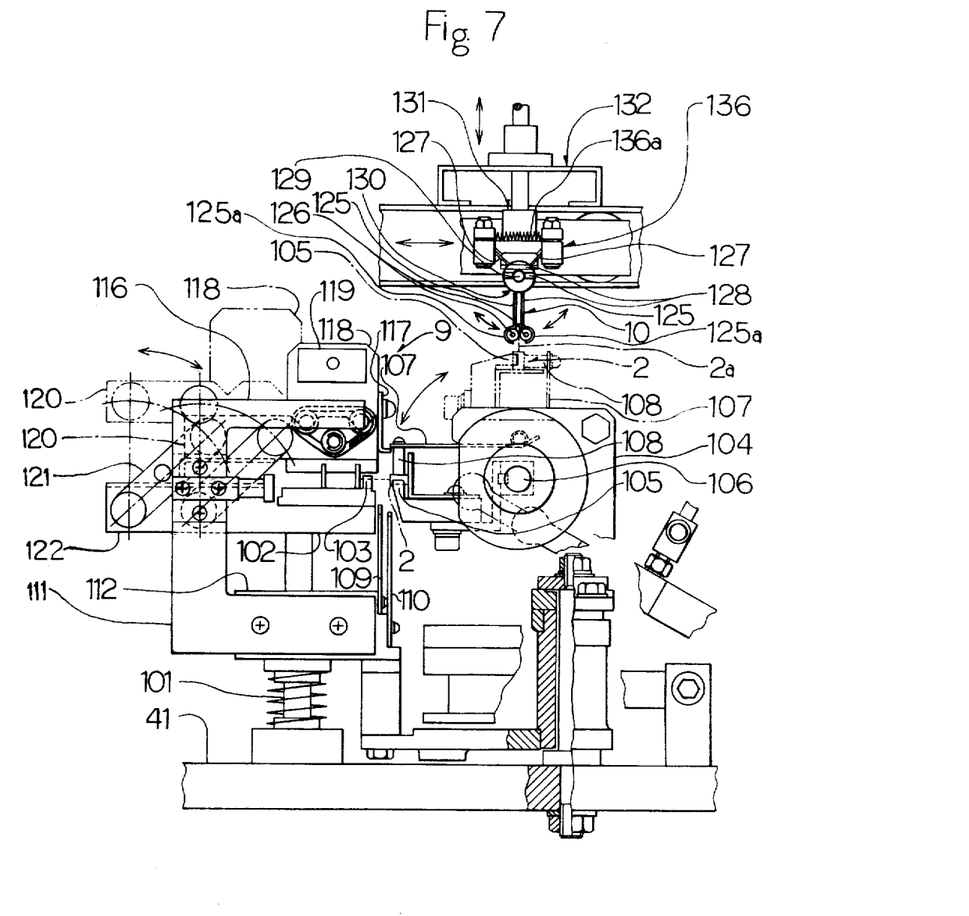
FIG. 7 is a side elevational view of the capacitor aligning device taken along the line VII—VII in FIG. 5 and added with a side view of a capacitor holder.

The clutch device 90, upon receiving the capacitor element 2 from the transmission device 50, is moved to the leftward direction to the capacitor aligning device 9. As shown in FIGS. 5-7, the aligning device 9 is composed substantially of an elongated plate 103 and another elongated plate 105 laterally spaced from the plate 103. The plate 103 is formed at the upper side thereof with a predetermined number of evenly spaced grooves which are each W-shaped in vertical section each for receiving a pair of leads 2a of the capacitor element 2, and is located on a support 102 which is secured to the upper ends of two vertical shafts 101 (one of which is shown in FIGS. 5 and 7) provided on the bed plate 41. The plate 105 is formed at the upper side thereof with a predetermined number of arcuated grooves evenly spaced from each other each for receiving a head 2b of the capacitor element 2, and is pivotally mounted on a laterally arranged shaft 106 (FIGS. 6 and 7) which is supported by a support 104. The plate 105 is, therefore, turned 90° around the shaft 106 between the position as shown by the solid line and the position as shown by the imaginary line as shown in FIG. 7. The heads 2b of the capacitor elements 2 each received in the arcuate grooves of the plate 105 are pressingly held from the upper direction by an elongated holding element 108 which is mounted at one end of a support plate 107 normally biased in the downward direction by a spring (not shown).

A pair of elongated transmission elements 109, 110 are provided with the same number of capacitor receiving grooves as the aligning plates 103, 105, and are each moveable vertically and laterally along the aligning plates 103, 105 between the space therebetween. The transmission elements 109, each have W-shaped groove formation formed at the upper end thereof for receiving the pairs of leads of capacitor elements 2, and the other transmission elements 110 each have arcuate grooves formed at the upper end thereof for receiving the heads 2b of capacitor element 2. The transmission elements 109, 110 are each at the lower end thereof mounted at one side of a laterally elongated slide plate 112, which is mounted on a laterally elongated U-shaped frame 111 around the pair of vertical shafts 101 and located below the support 102 supporting the capacitor aligning plate 103. The slide plate 112 is laterally moved with a pitch corresponding to the space between the aligned capacitor receiving grooves of the capacitor aligning plates 103, 105 by a guide bar 113 which is connected to the above mentioned drive link 97 which is at the other end connected to a crank 115 swingingly reciprocated by a cam 114 which is rotated by a motor (not shown). As aforementioned, the drive rod 97 is connected to the crank 95 to laterally displace the capacitor clutch device 90 to transmit the capacitor element 2 to the capacitor aligning device 9.

As particularly shown in FIG. 6, the capacitor element 2 is brought to the position as shown by the imaginary line by the transmission device 90. Then the clutch 91 releases the capacitor element 2 to place latter in the intial grooves of the aligning plates 103, 105, the leads 2a in the W-shaped grooves of the plate 103 and the head 2b in the arcuated groove of the plate 105. Then the U-shaped frame 111 is moved up, and therefore the slide plate 112 is moved up together with the transmission elements. Thus the initially arranged pair of transmission elements 109, 110 support the capacitor element 2 off the grooves of the aligning plates 103, 105. At the same time, a plate 116 is secured to one end of the guide bar 113 (FIG. 5), is moved up together with the U-shaped frame 111 and engages an abutment 119 secured to one side of a release device 118 provided with a releasing element 117 and located above the aligning plate 103. Thus the releasing device 118 is moved up to cause the releasing element 117 to push up the holding element 108 from the aligning plate 105, so that the next lateral movement of the transmission elements 109, 110 may transmit the capacitor elements 2 to the next grooves of the aligning plates 103, 105. Thus a predetermined number of capacitor elements 2 (about 20 pieces) are placed one after another in the grooves of the aligning plates 103, 105. As particularly shown in FIG. 7, the releasing device 118 is operatively connected to a laterally movable plate 120 shown in the imaginary line which is operatively connected to the upper ends of a pair of links 121 arranged in parallel to each other which are each at the lower end thereof pivoted to a lower fixed plate 122, so that the laterally movable plate 120 may be operated to displace the releasing device 118 in the leftward direction clearing the upper part of the aligning plate 103.

Figure 11:
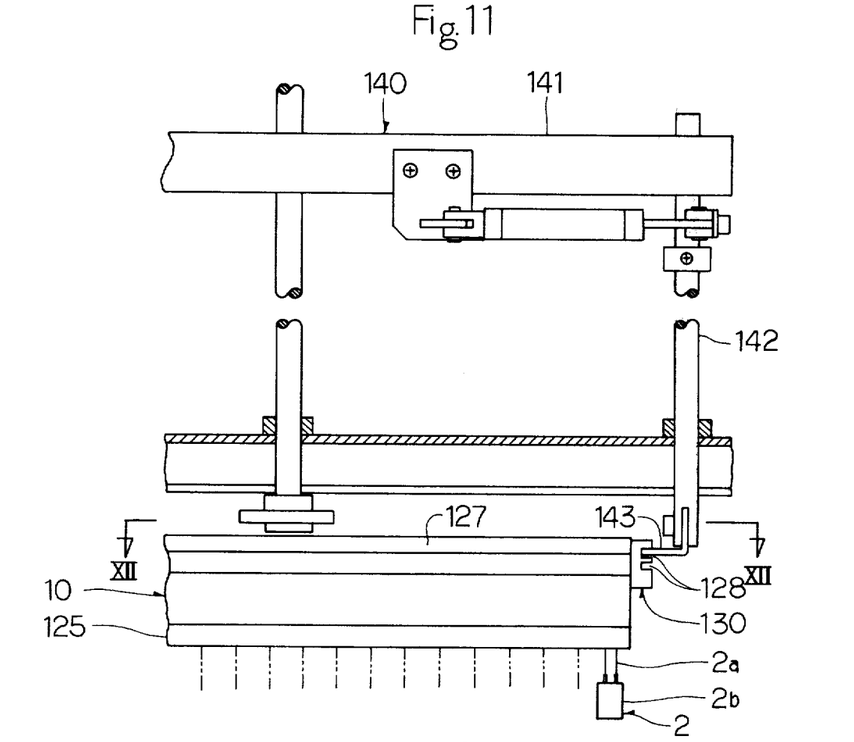
FIG. 11 is a front elevational view of the capacitor holder supported by the holder conveying device which is partly shown.
Figure 12:
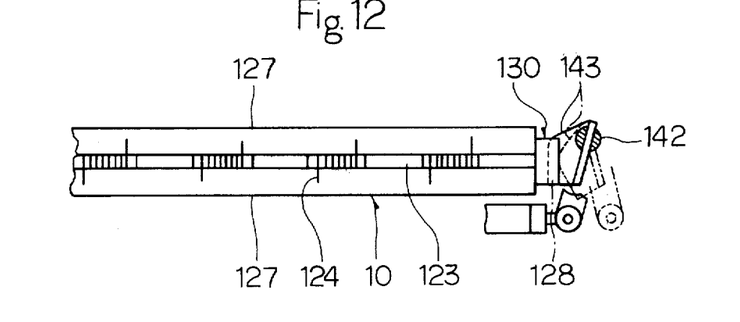
FIG. 12 is a plan view taken along the line XII—XII in FIG. 11.

Then as shown in FIG. 7, the aligning device 9 including the aligning plate 105 and the holding element 108 is turned up 90° around the shaft 106 to the position shown by the imaginary line as it is gripping the predetermined number of capacitor elements 2 in alignment, so as to hand over the aligned capacitor elements 2 to the holding device 10. The holding device 10 is, as shown in FIGS. 7, 11 and 12, is composed substantially of a shaft 123 and a pair of holding plates 125 pivotally mounted on the shaft 123. The holding plates 125 are each formed with a pair of lower capacitor gripping part 125a and a pair of upper knobs 127. The capacitor gripping parts 125a are each arcuate in the vertical section to receive elastic rollers 126 in alignment for gripping the leads 2a of capacitors 2 with each pair of opposite rollers 126. The holding plates 125 are normally biased to move toward each other at the lower gripping parts 125a to thereby press the oppositely arranged rollers against each other as shown in FIG. 7 by a number of torsion springs 124 mounted around the shaft 123. Therefore, the holding device 9 is so structured that the lower clamping parts 125a are moved away from each other if the upper knobs 127 are pressed toward each other against the action of the torsion springs 124. The shaft 123 of the holder device 10 has a diametrically enlarged part 130 provided on both sides thereof. The enlarged part 130 is formed with a central bore 129 and lateral grooves 128 by which the holder device 10 is conveyed to the next process.

Figure 9:
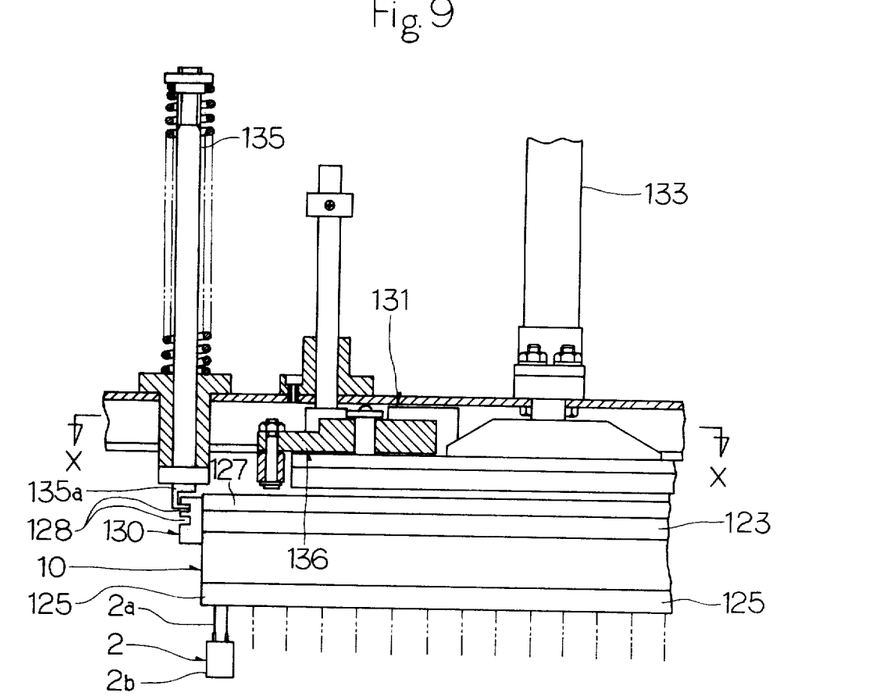
FIG. 9 is a front elevational view of the capacitor holder supported by a holder conveying device which is partly shown and partly in vertical section.
Figure 10:
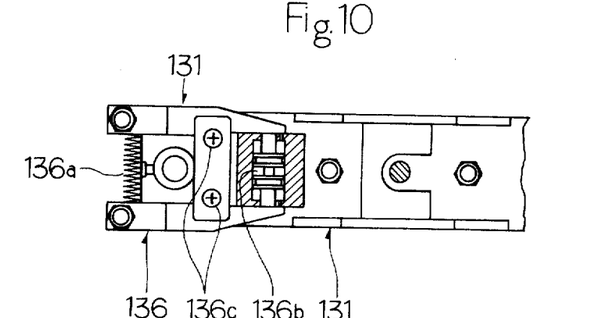
FIG. 10 is a plan view taken along the line X—X in FIG. 9.

A pair of holder operating devices 131 as shown in FIGS. 7, 9 and 10 (one of which is shown) are normally located above the capacitor element aligning device 9 and are positioned in a part of a transmission device 132 on both sides of a vertically movable shaft 133, and are operated together with the shaft 133 by a compressed air flow. The holder operating device 131 (FIGS. 9 and 10) has a pair of arms pivoted on pivots 136c respectively and outwardly biased by a spring 136a at the gripping ends thereof. A pair of carrier shafts 135 (one of which is shown in FIG. 9) with a lower carrier element 135a engages one of the lateral grooves 128 in the enlarged part 130 of the shaft 123 of the holder device 10 to support the latter. As the shaft 133 is moved down together with the holder operating device 131 and the carrier shaft 135 to a predetermined position, the arms 136 of the holder operating device 131 are operated by the compressed air flow coming into the cylinder 136b thereof, and press the knobs 127 of the holder device 10 toward each other to thereby open the lower capacitor clamping parts 125a against the action of the torsion springs 124. As the opened holder operating device 131 comes over the leads 2a of the aligned capacitor elements 2 as shown in FIG. 7, the compressed air is evacuated from the cylinder 136b, and the capacitor holder device 10 grippingly holds the leads 2a of the aligned capacitor elements 2 by the action of the torsion springs 124.

Figure 8:
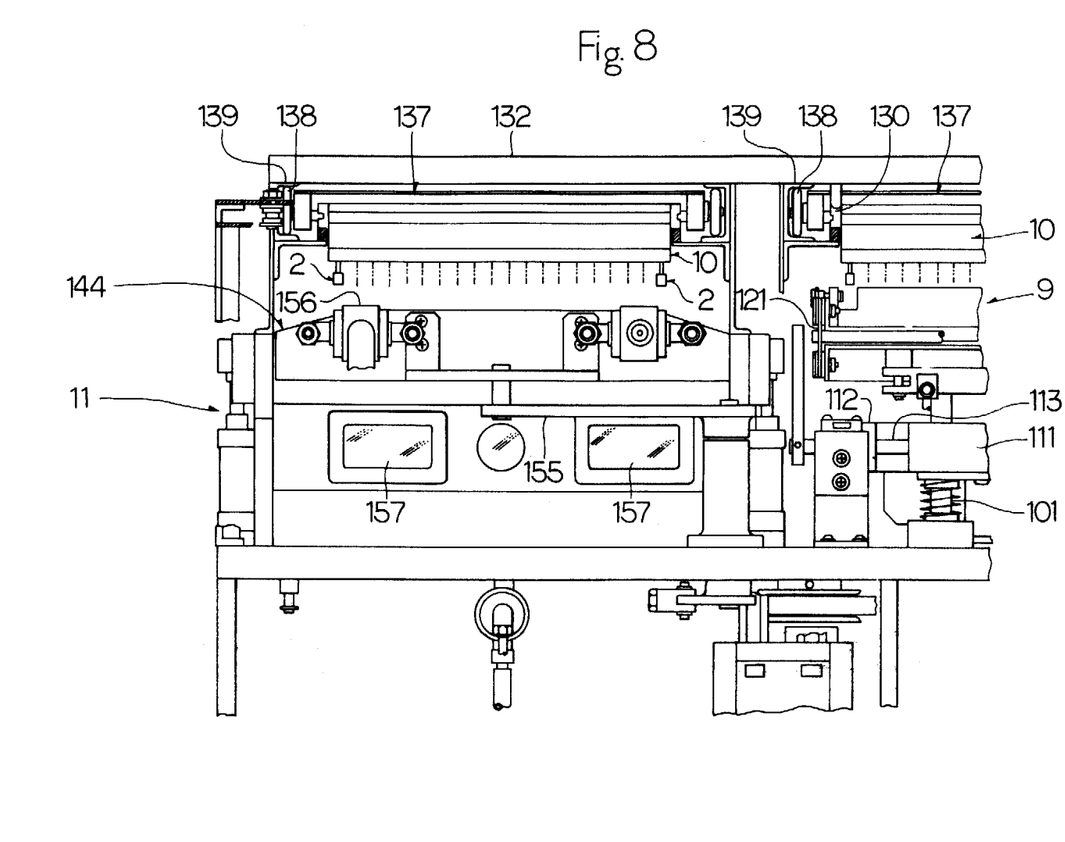
FIG. 8 is a front elevational view of the capacitor holder and an electrolyte impregnating vessel according to the invention.

As shown in FIG. 8, a transmission device 137 is arranged above the capacitor element holding device 10 and carries the latter by a pair of rollers 138 running in the respective races 139 in such a manner as the holding device 10 is supported by the carrier elements at the grooves 128 or bores 129 on both sides of the holding device 10. Thus the capacitor holding device 10 is carried, through a transmission device (not shown) for laterally displacing the holder device 10, to a position above the electrolyte impregnating vessel 11.

In reference to FIG. 11, a vertically movable transmission device 140 is provided above the electrolyte impregnating vessel 11. The transmission device is composed substantially of a laterally extended support 141 and a pair of spaced vertical support shafts 142 (one of which is shown). The transmission device 140 is vertically moved by a compressed air flow, and the vertical shafts 142 are each rockable by the compressed air flow around the axis thereof. The vertical shafts 142 are each provided with a horizontally bent support plate 143 secured to the lower end thereof. These support plates 143 are each inserted into one of the lateral grooves 128 of the capacitor holder device 10 to support the latter when the vertical shafts 142 are rocked. Then the transmission device 140 is moved down to a predetermined level where the capacitor holder device 10 is positioned in the electrolyte impregnating vessel 11. Then the rockable shafts 142 are each rocked back and the support plate 143 is disengaged out of the groove 128 as shown in the imaginary line in FIG. 12. Then the transmission device 140 is moved up to the initial position leaving the holder device 10 down in the vessel 11.

Figure 14:
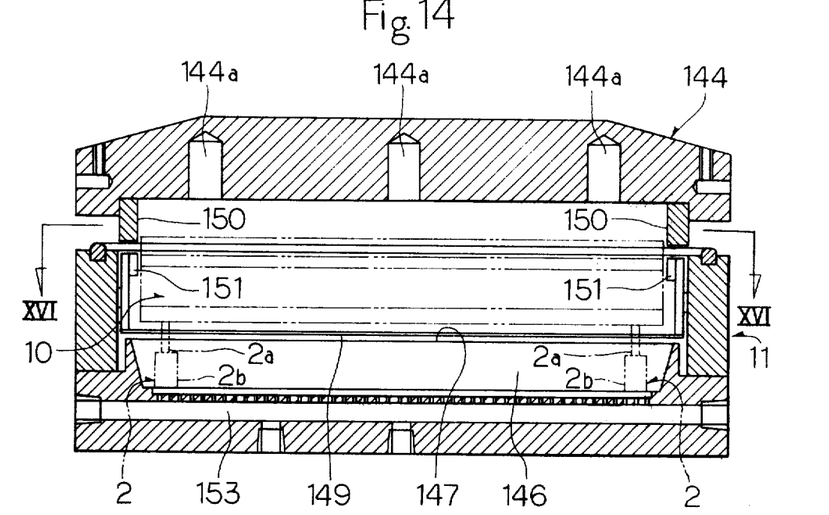
FIG. 14 is a front elevational view of the electrolyte impregnating vessel shown in a vertical section.
Figure 15:
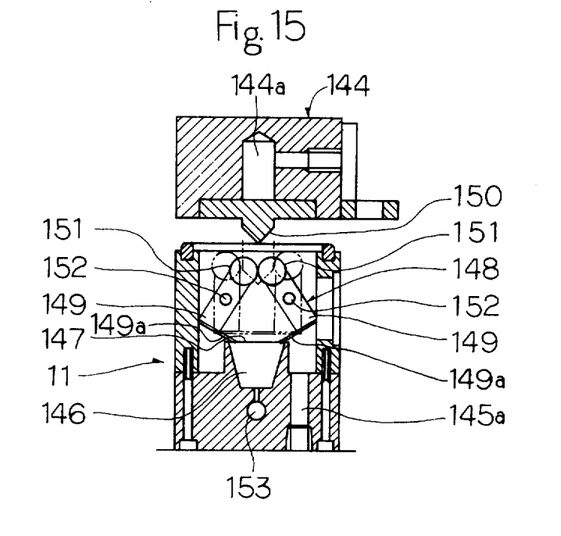
FIG. 15 is a side elevational view of FIG. 14 shown in a vertical section.
Figure 16:
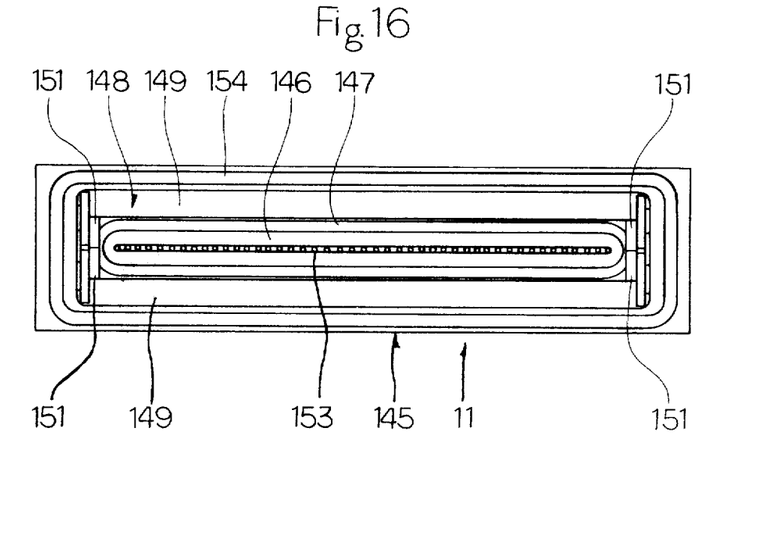
FIG. 16 is a plan view of FIG. 14 taken along the line XVII—XVII.

In reference to FIGS. 14, 15, and 16, the electrolyte impregnating vessel 11 is formed with a recess 146, which is trapezoidal in the vertical section, at the bottom thereof which is elongated lengthwise of the vessel 11 and is connected to a lower channel 153 for letting the electrolyte into and out of the recess 146. The electrolyte introduced into the recess 146 until it comes to the upper level 147 of the recess 146. The excess amount of electrolyte flows out of the upper open end of the recess 146 and is returned to a electrolyte tank (not shown). The electrolyte impregnating vessel 11 is provided therein with a screening device 148 which is composed of a pair of screening plates 149, 149 each L-shaped in the vertical section and turnable on pivots 152, 152 provided on both sides of the recess 146. The screening plates 149, 149 are each normally biased in the outward direction at the lower laterally extended ends 149a, 149a thereof and are opened as shown by the solid line in FIG. 15 allowing the aligned capacitor elements 2 to come down into the recess 146. In this case, a pair of upper operating parts 151, 151, each provided on both ends of the screening plates 149, 149, are pressed against each other as shown. The cover 144 for closing the electrolyte impregnating vessel 11 is provided with a pair of downwardly directed projections 150, 150 as shown. When the cover 144 is operated by the compressed air flow to close the vessel 11 from the upper direction thereof, the projections 150 come into between the engaged operating parts 151, 151 to turn the latter in the directions away from each other around the pivots 152, 152 so that the lower laterally extended ends 149, 149 of the screening plates come close to each other and form a screen represented by the imaginary line in FIG. 15. Thus as shown in FIG. 14, the leads 2a of the aligned capacitor elements 2 placed in the electrolyte impregnating vessel 11 are substantially screened off from the recess 146 of electrolyte. The leads 2a of the capacitor elements are, therefore, protected from the electrolyte while the heads 2b thereof are impregnated with the electrolyte. The electrolyte impregnating vessel 11 is vacuumized by an air evacuating pump 156 (FIG. 8), and is provided a pair of spaced transparent windows 157, 157 for inspecting the capacitor elements 2 in the vessel 11.

Figure 13:
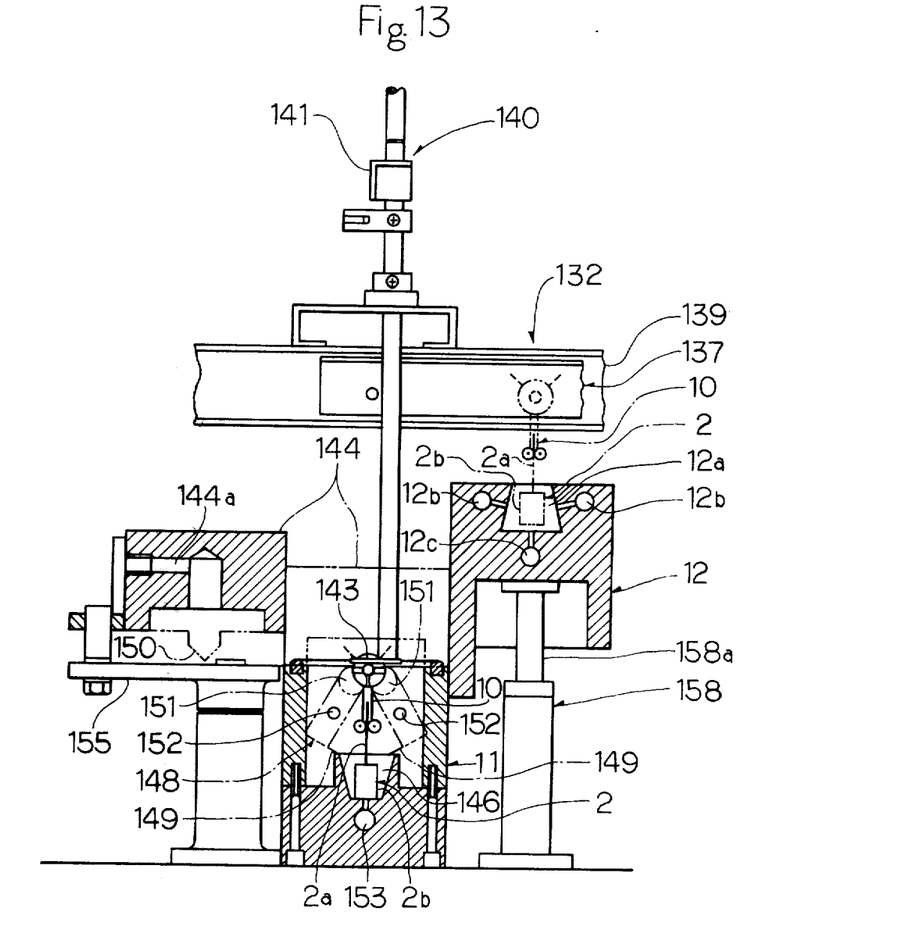
FIG. 13 is a side elevational view of the electrolyte impregnating vessel, an excess electrolyte blow-off chamber and a conveyer of the capacitor element holder.

In reference to FIG. 13, an electrolyte blow-off mechanism is provided on the right side of the electrolyte impregnating vessel 11. The mechanism 12 is composed substantially of a structure 12 extending lengthwise of the electrolyte impregnating vessel 11 and a cylinder 158, the vertically movable rod 158a of which supporting the structure at the end thereof as shown. The structure 12 is provided at the upper side thereof with a groove 12a which is substantially same with that of the vessel 11, extending lengthwise of the structure to receive therein the aligned capacitor elements which have been impregnated with the electrolyte. The structure has a pair of channels 12b provided lengthwise of the groove 12a on both sides thereof and each connected to the groove for jetting a compressed air flow into the latter to blow off the excess amount of the electrolyte from the capacitor elements 2. The structure 12 has another channel 12c provided below the recess 12a and connected to the bottom of the groove 12a to retrieve the excess electrolyte blown off from the capacitor elements 2.

With the foregoing structure of system, the invention is operated as follows; In reference to FIG. 1, the capacitor elements 2 are conveyed by the round vibrator one after another to the rotating element 4 having a number of magnets provided therein. The rotating element 4 attracts the leads 2a of capacitor elements 2 and guides the same into the grooved vibrator conveyer 5, in which the capacitor elements 2 are each oriented with the head 2b directed up as shown. The grooved vibrator conveyer 5 transmits the capacitor elements 2 to the reforming device 7 for reforming the bent or twisted leads 2a of capacitor elements 2.

In reference to FIG. 2, as the capacitor element 2 is transmitted toward the lead reforming device in the grooved vibrator conveyer 5, a compressed air is injected into the air cylinder 38. The cylinder rod 39 is, therefore, displaced in the rightward direction to thereby move the upper rack 31, which displaces the lead reforming member 33 in the same direction. On the other hand, the pinion 30 is rotated in the clockwise direction by the rack 31 and displaces the lower rack 32 in the leftward direction to thereby displace the other lead reforming member 36 in the same direction against the action of the compression spring 37. Thus the lead reforming members 33, 36 are spaced from each other. The capacitor element 2 is, therefore, able to arrive between the two reforming members 33, 36 as shown in FIG. 3. Then the supply of compressed to the air cylinder 38 is interrupted. As a result, the compression spring 37 pushes back the member 36 with its reaction in the rightward direction thereby to rotate the pinion 30 in the counterclockwise direction. As a result, the lead reforming members 33, 36 are pressed against each other as shown in FIG. 4. The leads 2a of capacitor element 2 are clamped by the two members 33, 36 in the W-shaped grooves 34 and spaced from each other by the central projection 35 defining the W-shaped grooves together with the other two projections. Thus the bent or twisted leads 2a of capacitor 2 are straightened in parallel alignment.

When the capacitor element 2 is clamped by the members 33, 36 of the lead reforming device 7, the transmission device 50 in FIG. 2 is activated. Namely the vertical shaft 56 is moved up by the grooved cam 77 and the lever 78 (FIG. 5). The support 53, which is connected to the upper end of the shaft 56 by way of the pin 54 and the grooved yoke 55, is therefore turned in the counterclockwise direction around the pivot 52 on the base 51. In the meantime, the capacitor gripping jaws 59, 59 on the support 53 are opened at the gripping end thereof by the action of the spring 60. Then the base 51 is moved down in association with the downward movement of the vertical shaft 51a due to the drive of the grooved cam 75 and the lever 71 (FIG. 5), and comes to the position as shown in FIG. 2 where the capacitor gripping jaws 59, 59 are depicted by the imaginary line and are ready to grip the head 2b of the capacitor element 2 which is clamped by the lead reforming device 7. Then compressed air is supplied through the flexible tube 66 to actuate the piston 65. The piston rod 64 is, therefore moved in the leftward direction and inserts the actuating element 63 into between the rollers 62, 62 of the respective jaws 59, 59 against the action of the spring 60. Thus the gripping jaws 59, 59 come close to each other and grip the head 2b of capacitor element 2 as shown by the conditional imaginary line.

When the vertical shaft 51a is moved up, the capacitor element 2 is pulled out from the lead reforming device 7, and the leads 2a are completely reformed straight and parallel with each other by the additional friction effect applied thereto by the W-shaped grooves and pressing face of the respective reforming members 33, 36. The transmission device 50 is moved back up to the position as shown in FIG. 2, and at the same time, the shaft 56 is moved down. As the result, the support 53 supporting the gripping jaws 59, 59 is turned 90° in the clockwise direction around the pivot 52 on the base 51 to the position shown by the solid line in FIG. 2 where the gripping jaws 59, 59 are directed sideways as shown. In this condition, the capacitor element 2 is handed over to the clutch device 90 located above the transmission device 50. Immediately after the capacitor element 2 is pulled out from the lead reforming device 7, compressed air is supplied into the air cylinder 38 to displace the lead reforming members 33, 36 away from each other as shown in FIG. 2 to be ready for clamping the next capacitor element transmitted to between the members 33, 36.

As shown in FIGS. 5 and 6, the pair of clutching elements 91a, 91b of the clutching device 90 are biased toward each other by the compression spring 93 in the directions as indicated by the arrow marks around the respective pivots 92, 92. The transmission device 50 clamping the head 2b of capacitor element 2 inserts the leads 2a of capacitor element up 2 into the above located pair of inverted V-shaped contact ends 91c of the clutching elements 91a, 91b against the action of the compression spring 93. Then the cam 114 is rotated to displace the crank 115 in the rightward direction, thereby to turn the crank 95 in the counterclockwise direction by way of the drive link 97. The crank 95 displaces the guide shafts 98, 98 in the leftward direction by way of the roller 96 secured to the carrier 94 which is fixedly mounted on the guide shafts 98, 98 on the bracket 99. As the result, the clutch device 90 carried by the carrier 94 is laterally displaced (about 30 mm) in the leftward direction. Simultaneously, the initially arranged transmission elements 109, 110 are laterally displaced (about 30 mm) by the crank 115 in the rightward direction as depicted in the imaginary line in FIG. 6 below the clutch 91 of the clutch device 90. Thus the transmission elements 109, 110 come to a position immediately below the capacitor element 2 held by the clutch 91. Then the transmission elements 109, 110 are upwardly moved to support the leads 2a and head 2b respectively of capacitor element 2. At the same time, the clutch 91 is pushed up by a suitable device (not shown), and the clutch device 90 is turned in the clockwise direction in FIG. 5 around the pivot 94a on the carrier 94 against the action of spring 91e. Thus the clutch 91 goes away releasing and leaving the capacitor element 2 behind on the transmission elements 109, 110.

Then the crank 115 is moved in the leftward direction in FIG. 5 and displaces the transmission elements 109, 110 laterally in the same direction (about 30 mm) and locates the capacitor element 2 at a position immediately above the initial grooves of the aligning plates 103, 105. Simultaneously, the clutch device 90 is displaced back in the rightward direction (about 30 mm) and is returned to the position as shown in FIG. 5. Then as transmission elements 109, 110 are moved down, the capacitor element 2 is placed on the aligning plates 103, 105, i.e., the leads 2a of which placed on the initial groove of the aligning plate 103 and the head 2b of which placed on the initial groove of the aligning plate 105. Specifically, the transmission elements 109, 110 are moved along the quadrilateral locus 112a as shown in FIG. 5 to transmit the capacitor element 2 to the aligning device 9 from the clutch device 90.

In synchronism with the quadrilateral movement of the transmission elements 109, 110, the capacitor holding element 108 is moved up and down with respect to the aligning plate 105 by the action of vertically movable releasing device 118 including the releasing element 117. The holding element 108 is moved down and holds the head 2b of capacitor element 2 when the capacitor element 2 is placed in the respective grooves of the aligning plates 103, 105 as the transmission elements 109, 110 are moved down below the aligning plates 103, 105. With the repetition of synchronized movements made by the transmission elements 109, 110 and the capacitor holding element 118, the capacitor element 2 in the initial grooves of the aligning plates 103, 105 is transmitted by the secondly arranged transmission elements 109, 110 to the next grooves of the aligning plates 103, 105, and the initial grooves of the aligning plates 103, 105 are occupied by a new capacitor element 2 transmitted thereto by the initially arranged transmission elements 109, 110 which receives the capacitor element from the clutch device 91. Thus the capacitor elements 2 are aligned one after another on the aligning plates 103, 105 until the initial capacitor element 2 is transmitted, for example, to the twentieth grooves of the respective aligning plates 103, 105. At that time, the capacitor element aligning operation is finished. At the same time, the releasing device 118 is, together with the releasing element 117, laterally displaced in the leftward direction to the position as shown by the imaginary line in FIG. 7 by the parallel links 121 which are turned in the counterclockwise direction to the position as shown by the imaginary line, and the upper part of the capacitor aligning plate 103 is cleared up.

Then the capacitor aligning device 9, aligning a predetermined number of capacitor elements by the aligning plate 105 and the holding element 108 is turned 90° in the clockwise direction around the shaft 106 to the position as shown by the imaginary line in FIG. 7, and directs upwardly the leads 2a of capacitor elements 2. The above located holder device 10 is moved down and grippingly holds the leads 2a of aligned capacitor elements 2. Namely in reference to FIG. 9, a pair of carrier shafts 135 (one of which is shown), each supporting the holder device 10 at both ends 130 thereof by the lower support element 135a, thereof are moved by the vertically movable shaft 133 down to a predetermined position together with the holder operating device 136 which has the arms 136 normally clamping the upper knobs 127 of the holder device 10. The arms 136 of the operating device 131 are normally pressed against the knobs 127 of the holder device 10 by the action compressed air flow supplied into the cylinder 136b thereof, thereby to open the lower gripping parts 125a, 125a of the holder device 10. In the lower predetermined position, the supply of compressed air flow is stopped to the cylinder 136b to allow the holder device 10 to close the lower gripping parts 125a, 125a by the action of torsion springs 124 thereof. Thus the holder device 10 grippingly holds the leads 2a of aligned capacitor elements 2.

Then the vertical shaft 133 is moved up to a predetermined position, where the transmission device 137 conveys the holder device 10 by the rollers 138 along the races 139 toward the viewer in FIG. 8, and then transmits the holder device 10 to the race on the right side through a transverse transmission device (not shown). Thus the holder device 10 is brought to the position immediately above the electrolyte impregnating vessel 11. Then the vertically movable transmission device 140 is operated to turn a pair of vertical shafts 142 (one of which is shown) to insert the lower support plate 143 into one of the grooves 128 at the end of the holder device 10 as shown in FIG. 11. The transmission device 140 is then moved down and locate the aligned capacitor elements 2 in the electrolyte impregnating recess 146 within the vessel 11. The transmission device is then moved up leaving the capacitor elements down in the electrolyte impregnating vessel 11 as the elements 2 are held by the holder device 10.

Then as shown in FIG. 13, the cover 144 is laterally moved to a position immediately above the electrolyte impregnating vessel 11 from the position as shown in FIG. 13 to the position as shown in FIG. 15, and the moved down to seal the vessel 11. In the meantime, the depending projections 150 of the cover 144 are inserted into the upper operating ends 151, 151 of the screening device 148, thereby to close the lower laterally extended ends 149, 149 as shown by the imaginary line in FIG. 15. Thus the screening device 148 is closed from both sides of the leads 2a of capacitor elements 2, thereby to screen off the substantial parts of the respective leads 2a of capacitor elements 2 from the electrolyte impregnating recess 146. Since the cover 144 is pressed against the sealing member provided all around the upper edge of the vessel 11, the latter is completely sealed up by the cover 144. Then the air evacuating pump 156 in FIG. 8 is operated to evacuate the air within the vessel 11 through the channels 144a provided in the cover 144, thereby to vacuumize the inner chamber of the electrolyte impregnating vessel 11 and the capacitors 2 themselves.

When the vacuum reaches to a predetermined degree, an electrolyte supplying pump (not shown) is operated to supply the electrolyte into the recess 146 of the vessel 11 through the channel 153 until it comes to the upper level 147 of the recess 146. Then a sensor (not shown) senses the amount of the electrolyte and causes the pump to stop the supply of electrolyte. With the subsequent lapse of a predetermined time about 20 seconds, the aligned capacitor elements held by the holder device 10 are all evenly impregnated with the electrolyte. When the electrolyte is excessively supplied into the electrolyte impregnating recess 146 of the vessel 11, the excess amount of electrolyte flows out at the upper end of the recess 146 into the outlet channel 145a and returns into the separate pump. Further, since the substantial parts of capacitor leads 2a are screened off from the electrolyte by the screening device 148, the electrolyte will not contact the leads 2a of capacitor 2, if the electrolyte is splashed up during the electrolyte impregnating process.

When the capacitor elements 2 have been impregnated with the electrolyte, the cover 144 is moved up and releases the screening device 148, and the lower laterally extended ends 149a are outwardly opened as shown in FIG. 15. Thus the chamber of the electrolyte impregnating vessel 11 is released to the atmosphere and then the pump is operated to evacuate the electrolyte from the recess through the channel 153.

Then the vertically movable transmission device 10 is moved down and is operated to turn the vertical shafts 142, 142, to thereby insert the lower support plates 143, 143 respectively into the grooves 128, 128 on both sides of the holder device 10, and then moved up supporting the holder device 10 as it is holding the aligned capacitor elements 2. Thus the holder device 10 is taken out of the electrolyte impregnating vessel 11 together with the capacitor elements 2. The holder device 10 is then conveyed by the transmission device 137 in the rightward direction in FIG. 13 to the position immediately above the blow-off mechanism 12. Then the vertical air cylinder 158 is operated to move up the operating shaft 158a supporting the blow-off structure 12 until the recess 12a of structure 12 comes to receive the heads 2b aligned capacitor elements 2. Then compressed air jets out against the aligned capacitor elements 2 from the channels 126, 126 arranged on both sides of the recess 12a of the structure 12, to blow off the excess amount of electrolyte from the capacitor elements 2. The electrolyte blown off from the capacitor elements 2 is returned to the electrolyte supplying pump through the lower channel 12c. The capacitor elements 2 each impregnated with an even amount of electrolyte and made clean are then brought to the next treating process 14 in FIG. 1 where the capacitor elements are each provided with the rubber element 13.

I claim:

1. A system for automatically producing electrolyte impregnated capacitor elements each having a head and a pair of leads, said system comprising means for clamping the leads of each capacitor element to straighten and place the leads in parallel alignment as the capacitor element is conveyed thereto; means for aligning a predetermined number of reformed capacitor elements; holder means for taking up the aligned capacitor elements from the capacitor element aligning means as the holder means holds the leads of aligned capacitor elements; means vacuumized to impregnate the aligned capacitor elements with the electrolyte as the capacitor elements are brought thereinto and as such capacitor elements are held by the holder means; and transmission means including a first transmission device for conveying each capacitor element from the lead reforming means to the capacitor element aligning means, and a second transmission device for conveying the holder means into the electrolyte impregnating means.

2. A system as defined in claim 1, further comprising means so structured as to receive the aligned capacitor elements impregnated with the electrolyte; means for supplying a compressed air flow into the structured means; and another transmission means for conveying the aligned capacitor elements from the electrolyte impregnating means to the structured means.

3. A system as defined in claim 1, wherein said lead reforming means includes a member formed with W-shaped grooves and a member formed with an abutment, each operated to apply a pressure to the leads of each capacitor element located therebetween.

4. A system as defined in claim 1, wherein said capacitor element aligning means includes a first plate formed with a predetermined number of aligned grooves for receiving the heads of the capacitor elements, a second plate arranged opposite to the first plate and formed with aligned grooves for receiving the leads of the capacitor elements, and a holding element operated to hold the heads of the aligned capacitor elements arranged on the first plate, said capacitor element aligning means being operated to displace the leads of the aligned capacitor elements in the direction to the holder means.

5. A system as defined in claim 1, wherein said holder means is vertically moved by the second transmission device to grippingly hold the leads of the aligned capacitor elements and takes off the capacitor elements from the aligning means.

6. A system as defined in claim 1, further comprising another transmission means including a gripping device being operated to grip the head of each capacitor element clamped by the lead reforming means and to pull out each capacitor from the lead reforming means, clutch means operated to clutch the lead of each capacitor element as each capacitor element is brought thereto, and transmission elements each operated to support the head and leads of each capacitor element respectively and convey each capacitor element from the clutch means to the aligning means.

7. A system as defined in claim 1, further comprising means for supplying the electrolyte into the electrolyte impregnating means, said electrolyte impregnating means includes a vessel for receiving the aligned capacitor elements as the latter are brought thereinto by the second transmission device, and a cover operated to close the vessel after the aligned capacitor elements are brought into the vessel, said vessel being provided therein with a recess for receiving therein the heads of the aligned capacitor elements located in the vessel, said recess being formed to receive a predetermined amount of electrolyte supplied by the electrolyte supplying means when the vessel is vacuumized.

8. A system as defined in claim 7, wherein said electrolyte impregnating vessel is provided with a screening device which is operated by the cover as it closes the vessel to screen off the leads of the aligned capacitors from the recess.

* * * * *